(No Model.)
T. A. EDISON.
DYNAMO ELECTRIC MACHINE.
No. 287,513. Patented Oct. 30, 1883.
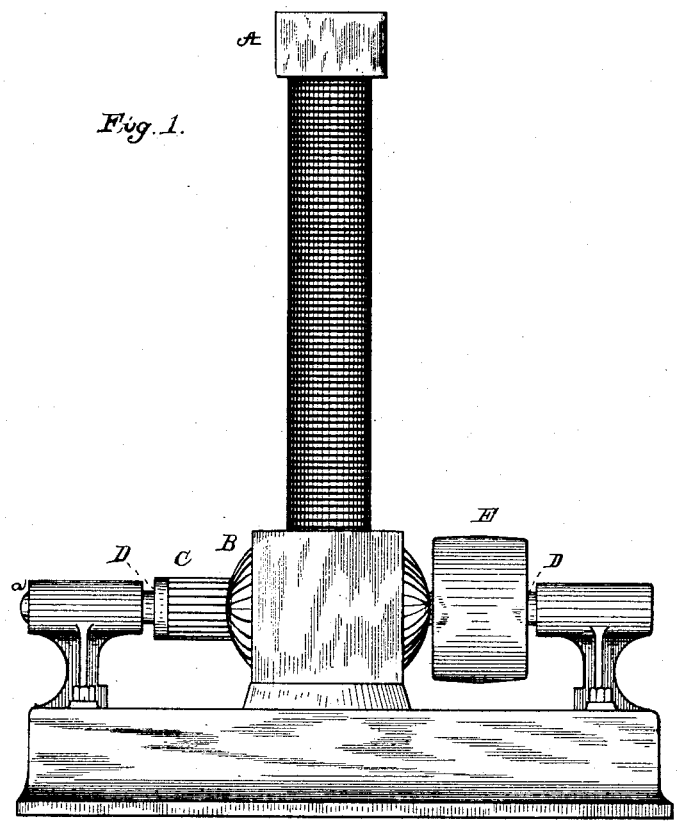
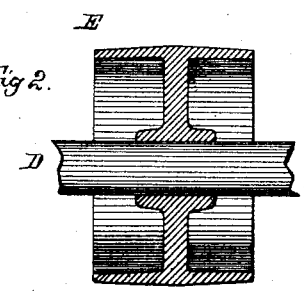
ATTEST: E. C. Rowland
INVENTOR: Thomas A. Edison
By Rich'd N. Dyer, Att'y

UNITED STATES PATENT OFFICE.

THOMAS A. EDISON, OF MENLO PARK, NEW JERSEY.

DYNAMO-ELECTRIC MACHINE.

SPECIFICATION forming part of Letters Patent No. 287,513, dated October 30, 1883.

Application filed June 29, 1883. (No model.)

*To all whom it may concern:*

Be it known that I, THOMAS A. EDISON, of Menlo Park, in the county of Middlesex and State of New Jersey, have invented a new and useful Improvement in Dynamo-Electric Machines, (Case No. 574,) of which the following is a specification.

In the operation of dynamo-electric machines by means of belts passing over pulleys on their armature-shafts difficulties or inconvenience is sometimes experienced from the fact that the pulley, having a considerable mass of magnetic material, is magnetically attracted by the field-magnet of the machine, and therefore the armature-shaft may be drawn toward the magnet, causing friction and heating at the bearing at the opposite end of the shaft.

The object of my invention is to obviate this difficulty; and to this end the invention consists in the use, in connection with the armature-shaft of a dynamo or magneto electric machine or electric motor of such construction that the pulley is sufficiently within the magnetic influence of the poles of the field-magnets to produce the objectionable result above specified, of a pulley of non-magnetic material. I prefer to employ brass for this purpose, though other non-magnetic metals, or suitable substances not metallic, may be used, if desired.

The invention is illustrated in the accompanying drawings, in which—

Figure 1 is a side elevation of a dynamo or magneto electric machine embodying said invention, and Fig. 2 a sectional view of the pulley used.

A is the field-magnet, B the armature, C the commutator, and D the armature-shaft, of the generator.

E is the pulley, by which the shaft is connected to a suitable source of power. Heretofore such pulleys, having been made of iron or steel, have been attracted toward the field-magnet A, and consequently the armature-shaft had a tendency to move toward the end $a$ farthest from the pulley, so that friction and heating were produced at this point. I construct the pulley E of brass or other non-magnetic material, and hence it is not magnetically attracted, and this difficulty is obviated.

It is evident that the invention is readily applicable to electromotors in which a pulley is attached to the armature-shaft for connection with the driving machinery.

It is to be understood that all patentable features of the invention shown or described, but not claimed herein, are reserved for protection by other patents, and have been or will be embodied in other applications for patents.

What I claim is—

1. The combination, with a dynamo-electric machine or electric motor whose field-magnets are so arranged that the driving-pulley is within the attractive influence of their poles, of a pulley of non-magnetic material, whereby the attraction of the pulley toward the poles is prevented, substantially as set forth.

2. The combination, with a dynamo-electric machine or electric motor whose field-magnets are so arranged that the driving-pulley is within their attractive influence, of a brass pulley, whereby the attraction of the pulley toward the poles of the magnet is prevented, substantially as set forth.

This specification signed and witnessed this 25th day of June, 1883.

THOS. A. EDISON.

Witnesses:
  H. W. SEELY,
  EDWARD H. PYATT.